United States Patent [19]

Seipos

[11] 4,272,938
[45] Jun. 16, 1981

[54] SHEET METAL CLIP FOR ASSEMBLY OF BUILDING COMPONENTS

[75] Inventor: Andrew G. Seipos, Miami, Fla.

[73] Assignee: Automated Building Components, Inc., Miami, Fla.

[21] Appl. No.: 86,132

[22] Filed: Oct. 18, 1979

Related U.S. Application Data

[63] Continuation-in-part of Ser. No. 953,760, Oct. 23, 1978.

[51] Int. Cl.³ .......................... E04B 1/38; E04B 1/58; E04B 1/60
[52] U.S. Cl. ........................................ 52/509; 52/483; 52/489; 52/714; 52/774; 411/448; 411/467
[58] Field of Search ..................... 85/11, 13; 24/73 B; 52/714, 509, 483, 489, 774, 546

[56] References Cited

U.S. PATENT DOCUMENTS

| | | |
|---|---|---|
| 705,626 | 7/1902 | Vogel . |
| 2,317,428 | 4/1943 | Anderson .......................... 52/714 X |
| 2,799,058 | 7/1957 | Swenson .......................... 52/714 X |
| 2,814,840 | 12/1957 | Sears .................................. 52/714 X |
| 3,225,643 | 12/1965 | Couch ................................. 85/11 X |
| 3,261,137 | 7/1966 | Jureit . |
| 3,331,180 | 7/1967 | Vissing et al. ........................ 52/714 |
| 3,393,488 | 7/1968 | Schneller ........................... 52/714 X |
| 3,828,514 | 8/1974 | Jureit .................................. 52/714 X |
| 3,908,850 | 9/1975 | Jureit ..................................... 217/70 |

FOREIGN PATENT DOCUMENTS

| | | | |
|---|---|---|---|
| 46-15574 | 4/1971 | Japan .............................. 85/11 |
| 425624 | 3/1935 | United Kingdom ..................... 52/714 |
| 1295047 | 11/1972 | United Kingdom ..................... 85/13 |

Primary Examiner—Alfred C. Perham
Attorney, Agent, or Firm—LeBlanc, Nolan, Shur & Nies

[57] ABSTRACT

A clip for attaching together planar wooden or like members comprising a one-piece sheet metal element having a flat base adapted to be seated on one of the members and provided along one edge with an outwardly open socket-like formation above a surface of its base for abutting engagement with the other of the members, the base having a bent nail portion formed by material displaced out of said base to leave an opening in the base and comprising a shank portion extending at an acute angle from an edge of said opening away from the base surface and the opening and a tip portion extending from a transverse bend toward the base opening and being adapted to angularly penetrate the one member, the included angle between the shank and tip portions being an acute angle, and the tip portion being bifurcated with the free ends of the bifurcations having oppositely lateraly outwardly inclined edges.

10 Claims, 9 Drawing Figures

SHEET METAL CLIP FOR ASSEMBLY OF BUILDING COMPONENTS

This is a continuation-in-part of Ser. No. 953,760 filed Oct. 23, 1978.

This invention relates to one-piece sheet metal nail clips particularly adapted for securing planar wooden members, such as the usual planar tongue and groove interconnected flooring members, to an underlying support member such as a wooden stud, and particularly to a special clip construction.

In prior art techniques, when planar wooden members having interlocking tongue and groove formations along opposite side edges are to be secured to underlying wooden supports these members are usually longitudinally interlocked one at a time with nails being toed into the rear edge of the grooved portion so as to secure the planar member to the support. An alternative to such a technique is to drive the nails through an outer surface of the planar member for securing it to the support strip. In the latter case, even when finishing nails are used, an undesirable appearance is created. With the prior technique, damage is often caused to the grooved portion as the nail is driven into place thereby affecting the interlock. Such damage is especially frequent when the amateur carpenter, which is the category into which most homeowners fall, attempts to use the toe nailing procedure.

Prior art sheet metal clips provided in efforts to improve over the foregoing techniques are disclosed for example in U.S. Pat. No. to Anderson 2,317,428; Sears U.S. Pat. No. 2,814,840; Schneller U.S. Pat. No. 3,393,488 and Vissing et al. U.S. Pat. No. 3,331,180. Jureit U.S. Pat. No. 3,828,514 discloses a sheet metal clip for attaching a metal stud to a wooden member and embodies an integral bent tooth portion. Another integral bent tooth portion in a clip is disclosed in Japanese Pat. No. 46-15574 published in 1971. Other bent tooth fasteners of this general type are disclosed in Jureit U.S. Pat. No. 3,908,850 and British Pat. No. 1,295,047. Vogel U.S. Pat. No. 705,626 discloses a sheet metal strap used for box bindings and the like wherein split barbs spread when entering a wooden member. Jureit U.S. Pat. No. 3,267,137 also discloses a split toothed fastener of sheet metal.

More recently the above identified parent application of applicant was filed disclosing a one-piece sheet metal clip having a base adapted to underlie a tongue and groove wooden flooring strip, this clip having at one edge a groove edge embracing formation and having a reversely bent nail portion formed of material displaced out of the base and adapted to be driven to penetrate the underlying stud and otherwise project no higher than the plane of the base.

The present invention will be disclosed and claimed as essentially an embodiment of the invention disclosed in the parent application as will appear.

It is therefore the major object of the invention to provide a novel one-piece sheet metal clip for securing together two wooden or like structural members wherein a flat base is formed along one edge for engaging one of the members and has a reversely bent nail portion of special construction adapted to be driven into the other member.

A further object of the invention is to provide a novel one-piece sheet metal clip comprising a flat base plate having along one edge an outwardly open embracing or socket formation, and having a reversely bent nail portion formed by material displaced out of the base plate extending away from that formation and terminating in a special bifurcated tip that extends angularly toward the opening from which it was displaced.

Further to the foregoing objects the invention contemplates as a specific object the provision of diverging inclined end edges on the bifurcations of the tip for promoting controlled lateral spreading as when the tip is penetrating a wooden support member.

Further novel features and other objects of this invention will become apparent from the following detailed description, discussion and the appended claims taken in conjunction with the accompanying drawings.

PREFERRED EMBODIMENTS

Figure 1:
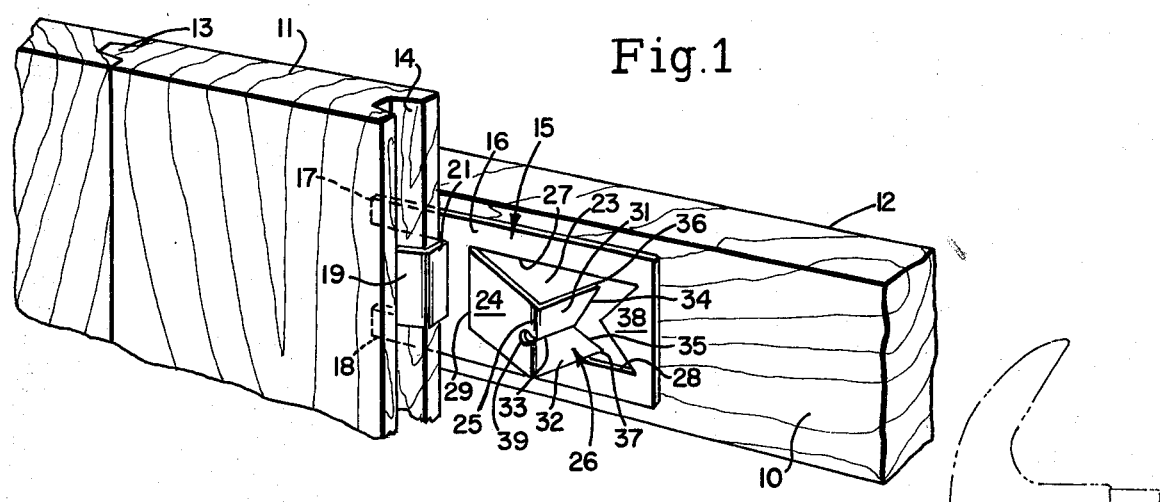
FIG. 1 is a generally perspective view rotated about 90° for clarity showing the invention according to a preferred embodiment.
Figure 2:
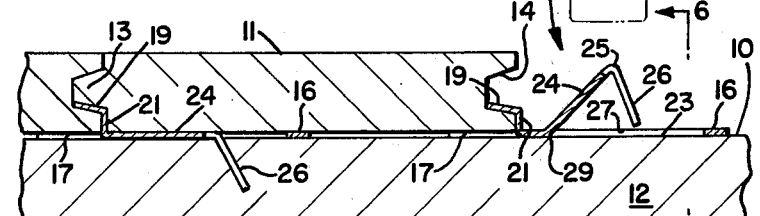
FIG. 2 is an enlarged section further illustrating the invention.

FIGS. 1 and 2 show the invention as embodied in the securing of planar wooden members such as flooring strips 11 to a wooden cross member such as a stud 12. In the illustrated embodiment the strips 11 have flat parallel top and bottom surfaces and are laid over the flat upper surface 10 of a stud 12. Strips 11 are formed on opposite longitudinal sides with tongues 13 and grooves 14, the strips being so laid that the each tongue fits into the groove of the adjacent strip to interlock adjacent strips.

In the invention a special one-piece sheet metal nail clip 15 is interposed between adjacent strips 11 and secured to a stud 12 below the strips.

Clip 15 comprises a flat base 16 integrally formed at one end with a groove wall embracing structure and adjacent the other end with a bent nail structure.

The groove wall embracing structure as shown in FIGS. 1-4 is a socket-like formation defined by two laterally spaced parallel legs 17 and 18 extending in the plane of base 16 and a coacting leg 19 spaced from the plane of base 16 and connected to base 16 by an upstanding arm 21. As shown leg 19 and arm 21 consist of metal displaced out of the base between legs 17 and 18 leaving an outwardly open recessed base opening 22 between legs 17 and 18. Preferably arm 21 extends at about right angles to base 16 and leg 19 extends at a small angle (about 15°) to the plane of base 16 to more snugly fit the groove side wall as will appear.

The nail structure, consisting of metal displaced out of the plane of base 16 to leave opening 23 in the base, comprises a flat shank 24 extending angularly at an acute angle relative to base 16 upwardly from an edge of opening 23 to a rounded bend 25 where the shank turns downwardly to provide a tip 26 extending at an angle toward opening 23. In a useful embodiment the shank 24 extends at an angle of about 45° to base 16 and tip 26 extends at an angle of about 75° relative to base 16.

Figure 3:
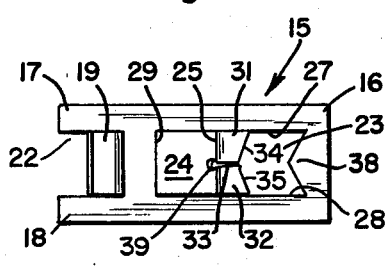
FIG. 3 is a top plan view of the novel one-piece sheet metal nail clip embodied in the invention.
Figure 5:
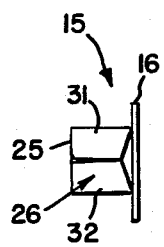
FIG. 5 is an end elevation of the clip of FIG. 3.

Referring to FIGS. 1 and 3 it will be seen that the opposite sides 27 and 28 of opening 23 are parallel and spaced about the same distance as legs 17 and 18. The hinged juncture 29 between shank 24 and base 16 is perpendicular to those sides 27 and 28 and parallel to bend 25, so that when the nail is displaced downwardly to penetrate a stud as will appear it will pass freely through opening 23.

A major difference between the present invention and the disclosure of said Ser. No. 953,760 is the character, shape and action of the nail tip 26. In the invention the nail tip is longitudinally bifurcated and consists of two parallel equal size side by side tip sections 31 and 32 spaced by a slit or slot 33 that extends from bend 25 to the free end of the tip. At their free ends the tip sections are formed with relatively inclined downwardly and outwardly diverging edges 34 and 35 that terminate in sharp points 36 and 37. Edges 34 and 35 may extend at any desired acute angle relative to a plane parallel to the base. As shown when the nail is struck out of the thin metal sheet base 16 formation of the tip edges leaves an inwardly projecting pointed projection 38 at the adjacent end of opening 23.

Preferably at the inner end of slit or slot 33 metal is removed to form a wider circular or like regional opening 39 as shown, the purpose of which is to facilitate automatic divergence of the tip sections as they penetrate the stud in assembly. It is within the scope of the invention to form slit 33 as a narrow slot, as by removing some metal, for further facilitating this action.

FIGS. 1 and 2 illustrate the incorporation of the invention in a useful environment. The studs 12 are fixed in place, there being several parallel studs 12 with their upper flat surfaces lying substantially in a plane, and the tongue and grooved relatively narrow floor strip members 11 are laid at right angles to the studs with adjacent tongues and grooves interfitted. As shown in FIG. 3, the generally rectangular opening 23 provided by displacement of metal to form the nail extends a major portion of the length of the base.

As illustrated in FIG. 1, a clip 15 is placed with its flat base 16 flush with the flat top surface of a stud 12 and with the U-shaped socket defined by legs 17, 18 and 19 embracing one edge of groove 14 of a strip 11 in the manner illustrated also in FIG. 2.

The user then preferably manually holds or urges the clip 15 toward groove 14 while he applies a downward hammer stroke, hitting the nail at the bend 25. This drives the tip 26 down through the base opening 23 until points 36 and 37 engage the stud and start to penetrate the stud. Contact of points 36 and 37 with the stud effectively determines the angle of penetration of tip 26 and the tip penetrates the wooden stud substantially at the angle shown by way of example in FIG. 2. It will be noted that this angle is determined by the included angle between the shank and tip and is an acute angle with respect to the vertical.

As the points 36 and 37 move into the stud, the shank 24 effectively rocks about the bend 29, and as the points penetrate the stud the angular relationship of the tip to the stud is effectively maintained. This results in the clip being positively maintained urged toward the left in FIG. 2 in snug abutment with the side edge of the groove.

Figure 6:
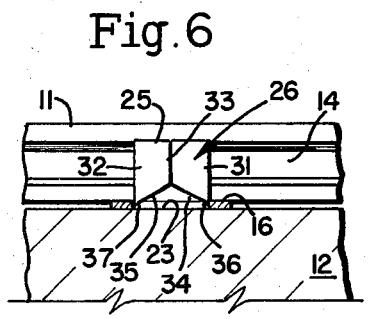
FIGS. 6, 7 and 8 are fragmentary illustrative views showing the clenching action of the nail as it penetrates wood.
Figure 7:
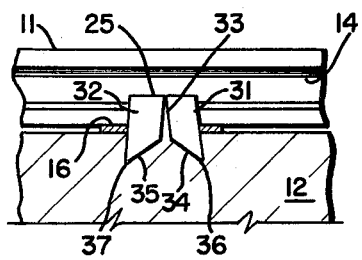
Figure 8:
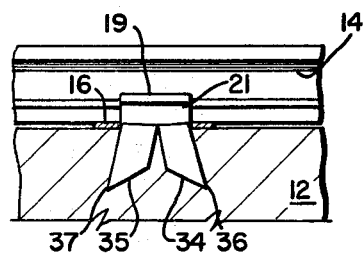
Figure 4:
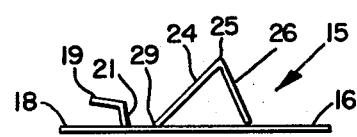
FIG. 4 is a side elevation of the clip of FIG. 3.

As the tip 26 penetrates into the stud, see FIGS. 6–8, the bifurcations are wedged laterally part by coaction of the laterally oppositely inclined edges 34 and 35 with the wood being penetrated, and eventually the tip 26 reaches the ultimate position shown in FIG. 8 wherein it is within the stud and the bifurcation tip sections are spread apart materially so that they positively serve to resist outward displacement of the tip from the stud. At this time the nail shank 24 has been forced to lie flat wholly within opening 23 and does not project above the plane of the base.

As a result of the foregoing the inclined laterally spread tip 26 of the nail which slopes away from the socket formation at 17–19 offers considerable resistance to withdrawal from penetration of the stud, and the clip 15 is locked securely in place with one edge in tight abutment with the groove of associated strip 11. Usually there is provided a clip 15 where each member 11 crosses a stud.

The clips 15 are composed of quite thin metal, about 1/16" or less in thickness and preferably are made of a galvanized mild steel that is not particularly resilient but is sufficiently malleable to retain a given shape, as when it is formed in a press and when it is hammered to operative position.

Figure 9:
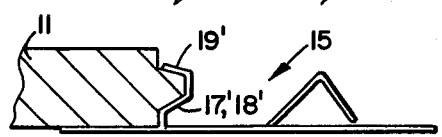
FIG. 9 is a side elevation showing a modified clip adapted to fit a tongue instead of a groove.

In some installations it may be required that the socket formation provided by legs 17, 18 and 19 be constructed to embrace a tongue 13 instead of a groove side wall. This would results in the structure illustrated in FIG. 9 wherein the upper socket leg 19' extends over the upper side of a tongue 13 and the legs 17' and 18' are bent up out of the plane of the base and then outwardly to underlie the lower side of tongue 13. Otherwise the clip is formed and used as shown in FIGS. 1–8.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A clip for attaching together wooden or like members consisting of a one-piece sheet metal element having a thin flat base adapted to be seated on one of said members and provided along one edge with an outwardly open socket-like formation consisting of metal displaced from said base and disposed above a surface of said base for abutting engagement with the other of said members, a bent nail formed by material displaced out of said base to leave an opening in said base and comprising a shank portion extending at an acute angle from a hinge along an edge of said opening away from the opening of said socket-like formation and away from said base surface and said opening and a tip portion extending from a transverse bend parallel to said hinge back toward said opening and being adapted to angularly penetrate said one member, the included angle between said shank and tip portions being an acute angle, and said tip being longitudinally bifurcated with the free ends of the bifurcation having oppositely laterally outwardly and downwardly inclined edges that terminate in relatively sharp points, whereby when said shank is bent about said hinge to drive said tip portion into said one member the clip is biased to more closely abut said socket with said other member while at the same time said bifurcations are caused to automatically diverge laterally outwardly so that when the shank of the nail enters into the base opening it lies flat on said one member while the imbedded bifurcations are disposed in both longitudinal and lateral angular relation relative to said base.

2. The clip defined in claim 1, wherein said tip portion is of substantially the same width as the shank portion and is bifurcated by a slit or slot that extends substantially from said bend to the free end of the tip portion.

3. The clip defined in claim 3 wherein the said slit or slot is formed adjacent said bend with an enlarged inner end region.

4. The clip defined in claim 2, wherein said bifurcations are substantially of the same size.

5. The clip defined in claim 2, wherein said bifurcations extend similarly angularly with respect to said base and said edges of the bifurcations extend in the same angular relation to the plane of said base.

6. In combination with the clip defined in claim 1, at least one of said other members having a longitudinal edge groove adapted to interlock with a corresponding rib on another of said other members disposed side by side therewith, with said other member or members being planar and being supportively laid over one or more flat surfaced one members, said clip base lying flush upon a flat support surface with said socketlike formation embracing one wall of said groove and with said tip portion being adapted to penetrate said one member after passing through said opening, said shank being disposed substantially wholly within said opening when the tip portion has fully penetrated, and said bifurcations being inclined away from said base and away from each other when said tip portion has fully penetrated.

7. In the combination defined in claim 6, said bifurcations similarly extending at an acute angle relative to said base, and edges extending laterally at substantially the same angle.

8. In combination with the clip defined in claim 1, at least one of said other members having a longitudinal edge tongue adapted to interlock with a corresponding groove on another of said other members disposed side by side therewith, with said other member or members being planar and being supportively laid over one or more flat surfaced one members, said clip base lying flush upon a flat support surface with said socketlike formation embracing said tongue and with said tip portion being adapted to penetrate said one member after passing through said opening, said shank being disposed substantially wholly within said opening when the tip portion has fully penetrated, and said bifurcations being inclined away from said base and away from each other when said tip portion has fully penetrated.

9. In the combination defined in claim 8, said bifurcations similarly extending at an acute angle relative to said base, and edges extending laterally at substantially the same angle.

10. A clip for attaching together wooden or like members consisting of a one-piece sheet metal element having a thin flat base adapted to be seated on one of said members and provided along one edge with an outwardly open socket-like formation consisting of metal displaced from said base and disposed above a surface of said base for abutting engagement with the other of said members, said socket formation comprising a first leg attached at one end to said base and extending approximately perpendicular to the plane of said base and a second leg connected to the other end of said first leg and extending at an angle of about 15° relative to the plane of said base, a bent nail formed by material displaced out of said base to leave an opening in said base and comprising a shank portion extending at an acute angle from a hinge along an edge of said base opening away from the opening of said socket-like formation and away from said base surface and said base opening, and a tip portion extending from a transverse bend parallel to said hinge back toward said base opening and being adapted to angularly penetrate said one member, said base opening extending a major part of the length of said base, the included angle between said shank and tip portions being an acute angle, and said tip being longitudinally bifurcated with the free ends of the bifurcations having oppositely laterally outwardly and downwardly inclined edges that terminate in relatively sharp points, whereby when said shank is bent about said hinge to drive said tip portion into said one member the clip is biased to more closely abut said socket with said other member while at the same time said bifurcations are caused to automatically diverge laterally outwardly so that when the shank of the nail enters into the base opening it lies flat on said one member while the imbedded bifurcations are disposed in both longitudinal and lateral angular relation relative to said base.

* * * * *